(12) United States Patent
Lisi et al.

(10) Patent No.: US 7,938,631 B2
(45) Date of Patent: May 10, 2011

(54) PUMP ROTATION ADAPTER (360 DEGREES ROTATION)

(75) Inventors: Dominic Lisi, Trumbull, CT (US); Michael Dumas, Monroe, CT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1539 days.

(21) Appl. No.: 11/316,607

(22) Filed: Dec. 21, 2005

(65) Prior Publication Data
US 2006/0275153 A1 Dec. 7, 2006

Related U.S. Application Data

(60) Provisional application No. 60/683,394, filed on May 20, 2005.

(51) Int. Cl.
*F04B 47/00* (2006.01)
(52) U.S. Cl. .......... 417/360; 285/67; 285/181; 285/325; 403/337
(58) Field of Classification Search .................. 417/360, 417/423.15; 285/181, 325, 412, 415, 368, 285/67, 272, 278, 280; 138/44; 403/335–337
See application file for complete search history.

(56) References Cited

U.S. PATENT DOCUMENTS

| 2,031,337 | A | * | 2/1936 | Spalding | 285/61 |
|---|---|---|---|---|---|
| 2,447,947 | A | * | 8/1948 | Larson et al. | 285/181 |
| 2,449,243 | A | * | 9/1948 | Miller | 277/623 |
| 2,449,592 | A | * | 9/1948 | Dandaio | 19/145.5 |
| 2,833,568 | A | * | 5/1958 | Corsette | 285/281 |
| 3,402,945 | A | * | 9/1968 | Rittenhouse | 285/192 |
| 3,592,564 | A | | 7/1971 | Conery et al. | |
| 3,642,617 | A | * | 2/1972 | Brink et al. | 210/704 |
| 4,083,133 | A | * | 4/1978 | Ravesteyn et al. | 37/336 |
| 4,503,680 | A | * | 3/1985 | Wood | 60/605.1 |
| 4,726,742 | A | | 2/1988 | Harbison et al. | |
| 4,824,334 | A | | 4/1989 | Ramsay | |
| 5,647,732 | A | | 7/1997 | Cali et al. | |
| 5,906,479 | A | | 5/1999 | Hawes | |
| 6,036,452 | A | | 3/2000 | Huang | |
| 6,331,020 | B1 | * | 12/2001 | Brunella | 285/179 |
| 6,386,595 | B1 | * | 5/2002 | Peppel | 285/281 |
| 6,715,994 | B2 | * | 4/2004 | Patel et al. | 417/12 |
| 6,811,188 | B2 | * | 11/2004 | Haviland | 285/272 |
| 2003/0127854 | A1 | * | 7/2003 | Lehnhardt | 285/181 |

\* cited by examiner

*Primary Examiner* — Devon C Kramer
*Assistant Examiner* — Patrick Hamo

(57) ABSTRACT

A method and apparatus are provided for coupling a pump to existing piping in a pump station such as a sewage or other suitable pump station. The adapter features a stand inlet adapter plate for coupling to one coupling of the existing piping; a pump adapter plate for coupling to a first port of the pump; and a clamp ring for coupling to the stand inlet adapter plate so as to allow the pump to be freely rotated a full 360° degrees if necessary in order to align another coupling of the existing piping to a second port of the pump, the stand inlet adapter plate being tightened and locked to the clamp ring after the pump is aligned for fastening the one coupling of the existing piping to the first port of the pump.

19 Claims, 7 Drawing Sheets

Exploded View of Adapter

Exploded View of Adapter

US 7,938,631 B2

PUMP ROTATION ADAPTER (360 DEGREES ROTATION)

CROSS-REFERENCE TO RELATED APPLICATIONS

This application claims benefit to provisional patent application No. 60/683,394 (WFVA/Flygt nos. 911-7.3/05FLT01), filed May 20, 2005, which is hereby incorporated by reference in its entirety.

BACKGROUND OF THE INVENTION

1. Field of the Invention

The present invention relates to an adapter; and more particularly, to an adapter for coupling a pump to existing piping in a pump station such as a sewage or other suitable pump station.

2. Purpose of or Problem Solved by Invention

Sewage pump stations around the country have aging pumps, many installed 20 to 40 years ago. In many cases, these pump stations are built in cities and towns that were not as congested as they are today. Often, the pump station cannot be expanded to accommodate new pumps so it is important to utilize existing inlet and outlet piping when replacing the old pumps.

Pumps, such as those sold by the assignee of the present patent application, have been used in many of the thousands of pump stations around the country and the world for over 100 years. Due to the assignee's excellent reputation in the sewage pumping arena, many municipalities have asked the assignee to quote on replacing old pumps not otherwise made and/or sold by the assignee with pumps sold by the assignee. While such replacement may sound like an easy task, they are not because many customers want to install the new pump in exactly the same area or footprint as the old one due to space restraints. Many times, the existing piping and check valves are in good condition and the customer prefers re-using them to save on cost.

The problem the assignee has when replacing or retrofitting the old pump is that their pump housings use a centerline discharge where most of the old pumps uses a tangential discharge pump housing. Both designs work; however, when a pump station is new, pumps, valves and piping can be laid out exactly as the pump manufacturer requests, but when the personnel from the assignee of the present patent application tried to retrofit an existing pump station, it is very difficult to hook a centerline discharge pump up to the existing tangential discharge piping in the known pump station.

Dry pit pumps sold by the assignee of the present application are normally sold with an inlet connection and outlet connection on top of each other or at the same angle. Bolting the pump to the inlet elbow or pump stand is limited in most cases to 90° intervals of rotation. In most cases, a 90° rotation is much too far to hook up to the existing piping. In some cases, additional bolt holes can be drilled in the pump stand and a 45° angle can be obtained. However, one would need to know the exact angle prior to drilling with no field adjustment available.

Most of the time, hooking up to existing piping is not an exact science. When components and piping start to come together during installation and assembly, usually even a 45° rotation will not work. One may need 39° or 48° or 22° or 19° or 40° . . . or any angle.

There is a need in the industry to address and solved this basic problem.

SUMMARY OF THE INVENTION

The aforementioned situation is what led to the development of the new pump rotation adapter according to the present invention.

The present invention features a method and apparatus for coupling a pump to existing piping. The adapter features a first member for coupling to a first coupling of the existing piping; a second member for coupling to a first port of the pump; and a third member for coupling to the first member so as to allow the pump to be freely rotated a full 360° degrees if necessary in order to align a second coupling of the existing piping to a second port of the pump, the first member being tightened and locked to the third member after the pump is aligned for fastening the first coupling of the existing piping to the first port of the pump.

In one embodiment of the adapter, the first member is a stand inlet adapter plate for coupling to the first coupling of the existing piping, and the second member is a pump adapter plate for coupling to the first port of the pump. Moreover, the third member is a clamp ring arranged between the first member and the first port of the pump.

Further, the adapter may also include a mating gasket arranged between the pump adapter plate and the first port of the pump; and an adapter plate gasket arranged between the stand inlet adapter plate and the pump adapter plate.

In operation, the new adapter according to the present invention fits between the inlet elbow and the pump housing and allows for 0° to 360° non-incremental rotation of the pump discharge, allowing ease in hooking up to existing piping, including that in known sewage pump stations.

This new pump rotation adapter also has the potential to work with new installations. Until now, on new construction, the personnel of the assignee of the present application would recommend their standard piping configuration, the pump inlet over the pump outlet. In most new construction jobs, the contractor has sufficient room to install the piping per our recommendations. However, if space is limited, it may be beneficial to slightly rotate the pump to allow for the piping to be installed in the restricted space.

The scope of the invention is also intended to include a pump station having such as adapter arranged therein, including a sewage or other suitable pump station, as well as other types of pump stations, including flood control pump stations, water purification pump stations, amusement park water ride stations, industrial fluids pump stations and/or agricultural fluid pump stations.

BRIEF DESCRIPTION OF THE DRAWING

FIG. 1 includes FIGS. 1a, 1b, 1c, wherein FIGS. 1a and 1b show diagram of an arrangement that includes a pump, an inlet of existing piping and an inlet flange adapter according to the present invention, and wherein

FIG. 3 includes FIGS. 3a, 3b, 3c, 3d, wherein FIG. 3a shows a view of the adapter when assembled according to the present invention, wherein FIG. 3b shows a cross-sectional view of the adapter when assembled, wherein

Figure 3A:
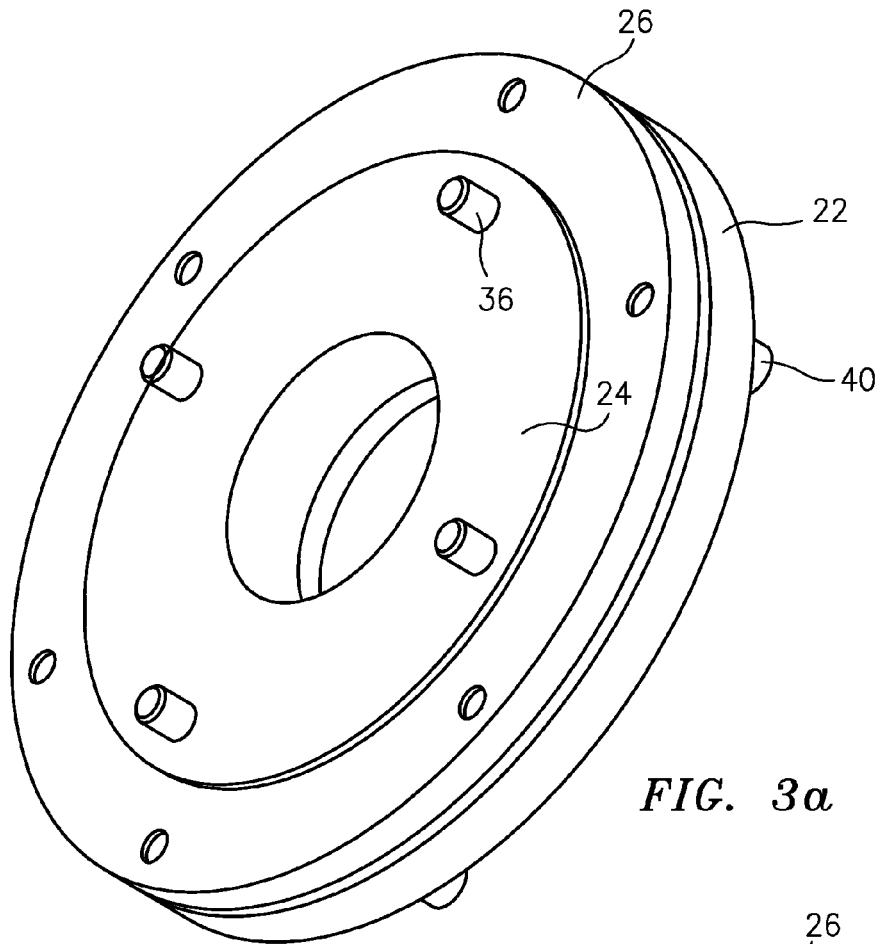
Figure 3B:
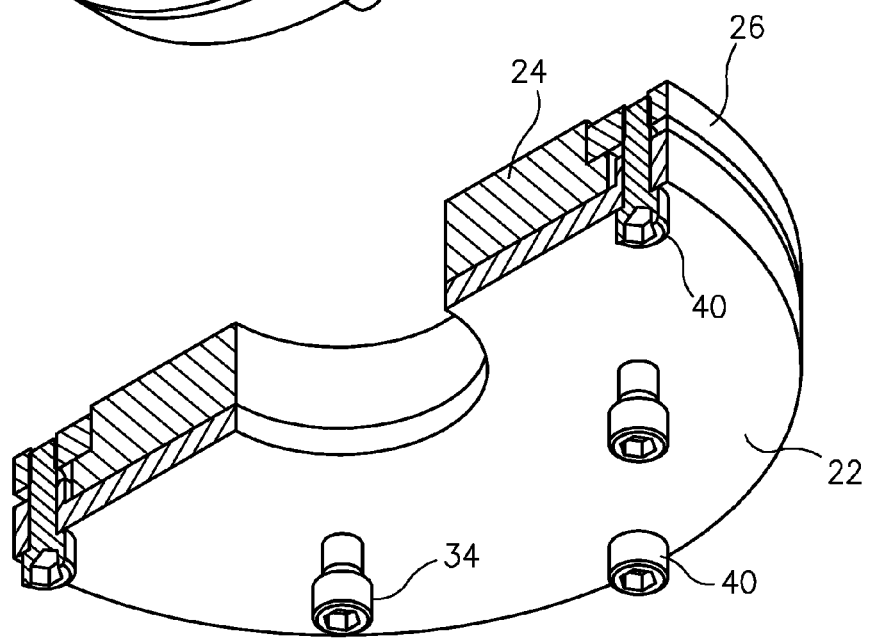
Figure 3C:
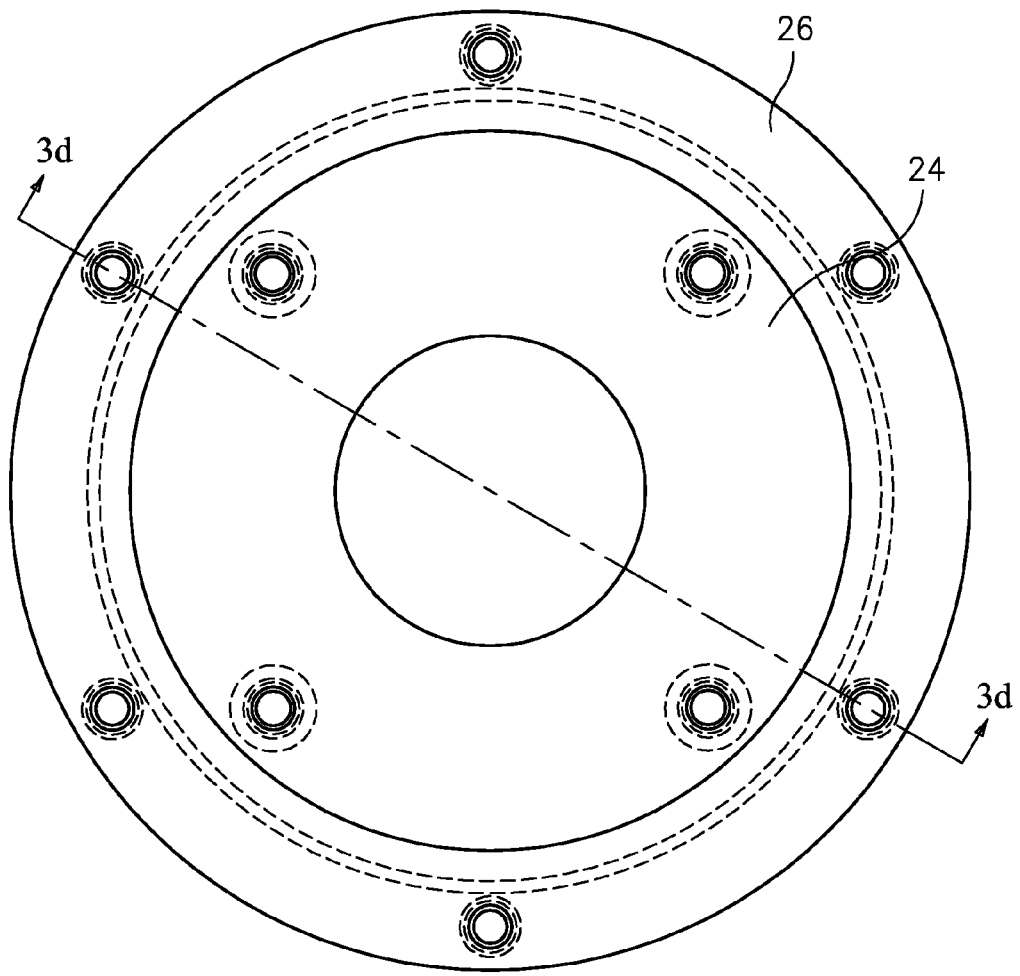
FIG. 3c shows a top view of the adapter when assembled, and wherein FIG.
Figure 3D:
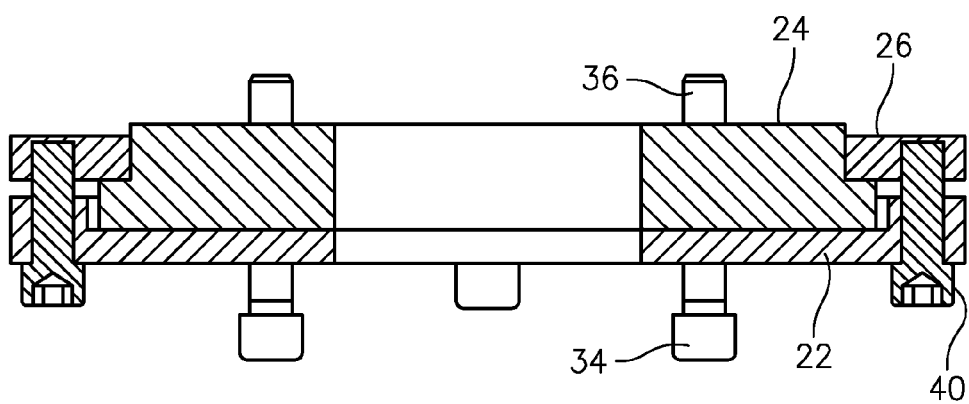

3d shows a cross-sectional view of the adapter when assembled in FIG. 3c along lines A-A.

Figure 4A:
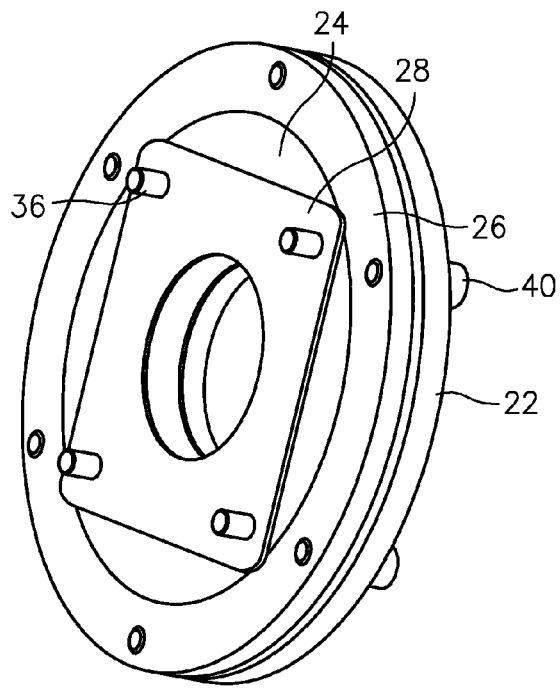
Figure 4B:
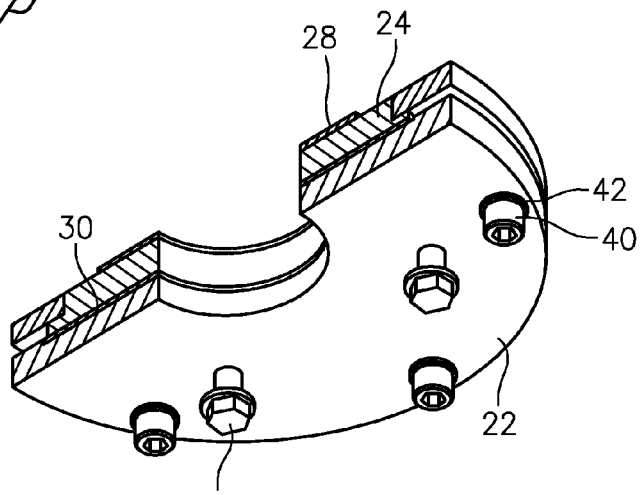
Figure 4C:
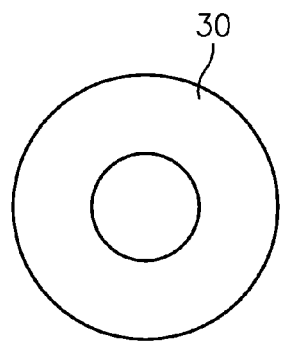
Figure 4D:
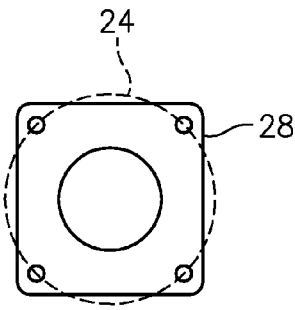
Figure 4E:
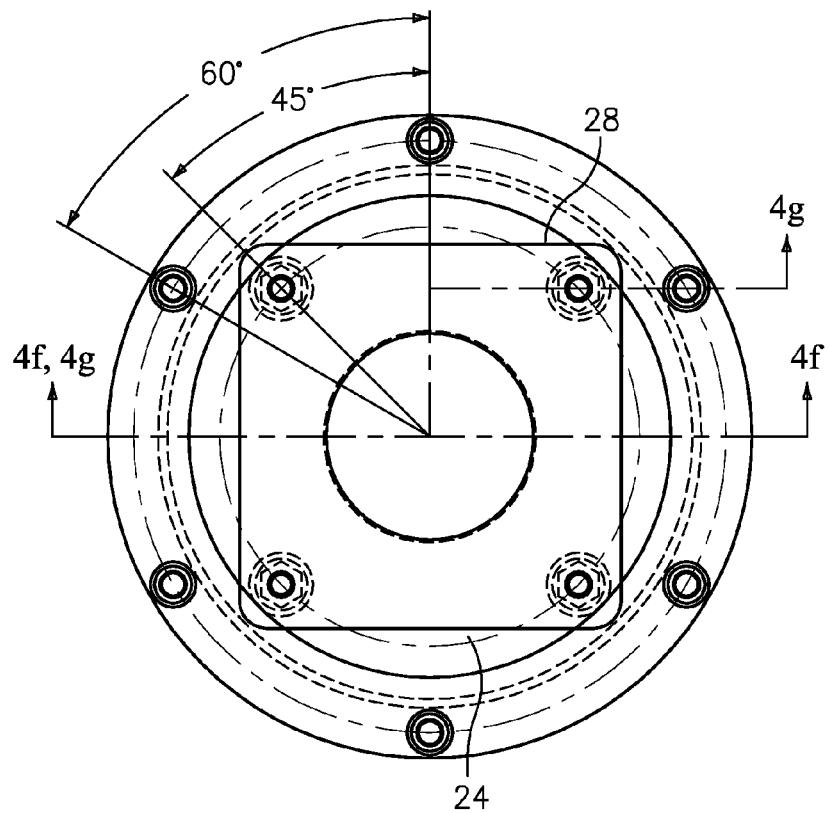
Figure 4F:
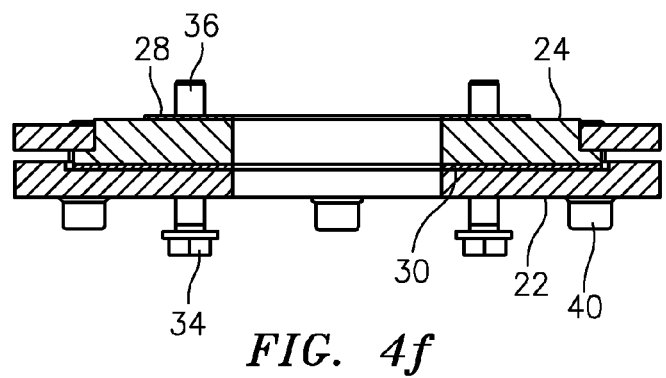
Figure 4G:
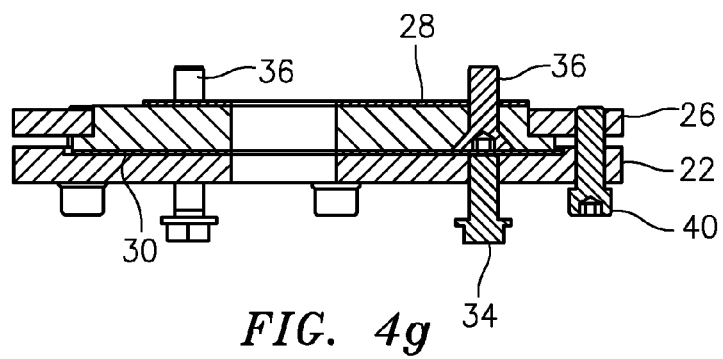

FIG. 4 includes FIGS. 4a, 4b, 4c, ..., 4f, wherein FIG. 4a shows a perspective view of the adapter when assembled with a gasket 10 according to the present invention, wherein FIG. 4b shows a cross-sectional view of the adapter when assembled, wherein FIG. 4c shows an assembly drawing of a gasket 7, and wherein FIG. 4d shows an assembly drawing of a gasket 10, and wherein FIG. 4e shows a top view of the assembled adapter in FIG. 4a, wherein FIG. 4f shows a cross-sectional view of the adapter in FIG. 4e along lines A-A, and wherein FIG. 4g shows a cross-sectional view of the adapter in FIG. 4e along lines B-B.

Figure 5:
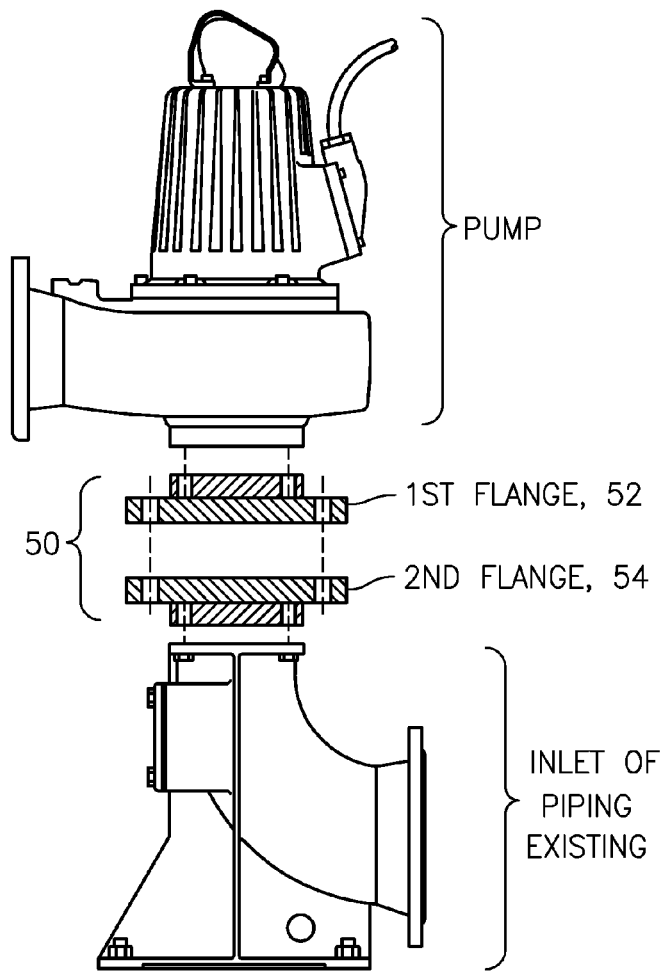

FIG. 5 shows an alternative embodiment of the present invention using two flanges, each with a multiplicity of bolt holes.

Figure 6:
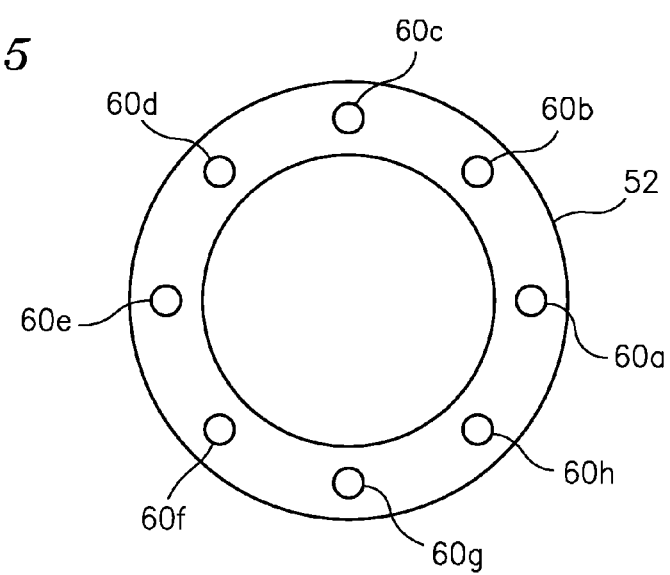

FIG. 6 shows one of the two flanges in FIG. 5 according to the present invention.

DETAILED DESCRIPTION OF THE INVENTION

Figure 1A:
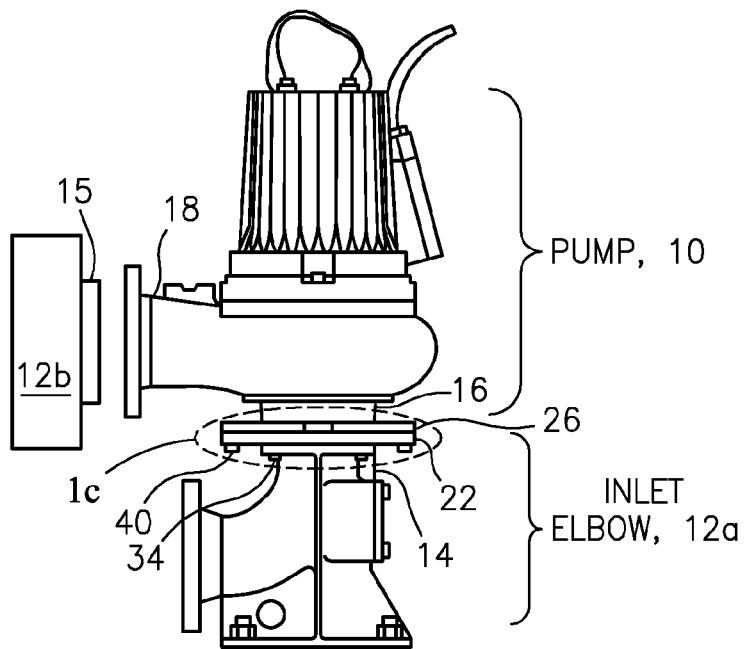
Figure 1B:
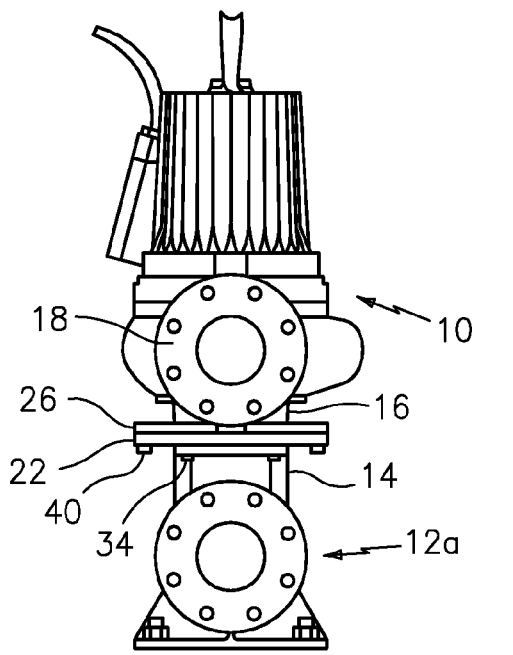

The present invention features a method and apparatus for coupling a pump generally indicated as 10 to one part of an existing piping having an inlet elbow 12a and outlet elbow 12b as best shown in FIG. 1a.

In one embodiment, the apparatus takes the form of an adapter generally indicated as 20 and shown in FIGS. 1-4. The adapter 20 features a first member 22 for coupling to a first coupling 14 of the existing piping 12; a second member 24 for coupling to a first port 16 of the pump 10; and a third member 26 for coupling to the first member 22 so as to allow the pump 10 to be freely rotated a full 360° degrees if necessary in order to align a second coupling 15 of the existing piping 12 to a second port 18 of the pump 10, the first member 22 being tightened and locked to the third member 26 after the pump 10 is aligned for fastening the first coupling 14 of the existing piping 12 to the first port 16 of the pump 10 when the pump 10 is installed.

Figure 1C:
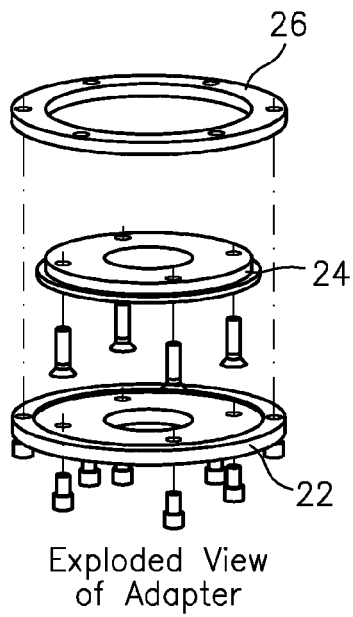
FIG. 1c shows an exploded view of the inlet flange adapter according to the present invention.
Figure 2:
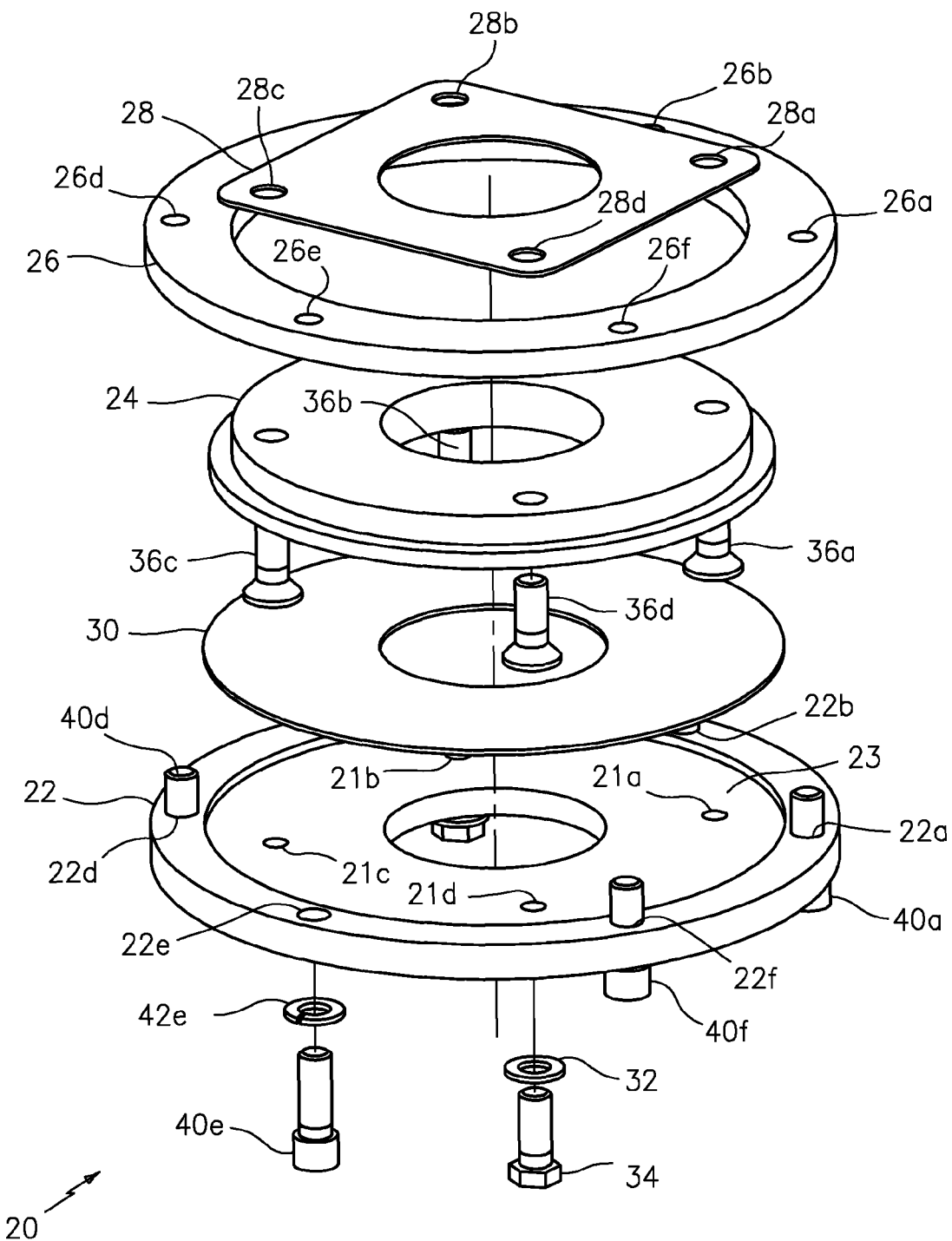
FIG. 2 shows a second exploded view of the inlet flange adapter according to the present invention with each piece thereof numbered and named accordingly.

As shown in FIGS. 1 and 2, the first member 22 is a stand inlet adapter plate for coupling to the first coupling 14 of the existing piping 12, and the second member 24 is a pump adapter plate for coupling to the first port 16 of the pump 10. Moreover, the third member 26 is a clamp ring arranged between the stand inlet adapter plate 22 and the first port 16 of the pump 10.

Further, the adapter 20 also has a mating gasket 28 arranged between the stand inlet adapter plate 22 and the corresponding coupling 16 of the pump 10, and an adapter gasket 30 arranged between the stand inlet adapter plate 22 and the pump adapter plate 24.

The rotation adapter 20 works to allow 360° rotation during installation. This adapter 20 allows for field adjustment to match up to the existing piping 12 in sewage pump stations or other suitable systems (not show). Once tightened, the adapter 20 according to the present invention will produce a watertight joint between the first coupling 14 of the existing piping 12 and the first port 16 of the pump 10.

Consistent with that shown in FIGS. 1-4, the adapter 20 may be used to install a pump 10 to existing piping using the steps of a method, as follows:

1) A custom recessed or stand inlet adapter plate 22 is attached to the first coupling 14 of the inlet elbow/stand 12 by suitable washers 32 and bolts 34 through bolt holes 21a, 21b, 21c, 21d, as best shown in FIG. 1.

2) The collar or pump adapter plate 24, the gasket mating 28, and the locking or clamp ring 26 are attached to the first port 16 of the pump 10 using four countersunk screws 36a, 36b, 36c, 36d which pass respectively through bolt holes 28a, 28b, 28c, 28d of the mating gasket 28. This secures the collar or pump adapter plate 24 to the first port 16 of the pump 10, while allowing the locking or clamp ring 26 to freely rotate.

3) The adapter gasket 30 is placed into a recessed area generally indicated as 23 of the stand inlet adapter plate 22.

4) The pump 10 is lowered onto the stand inlet adapter plate 22 until the collar or pump adapter plate 24 is resting on the adapter gasket 30.

5) The locking or clamp ring 26 can now be freely rotated so the six bolt holes 26a, 26b, ..., 26f align with the six bolt holes 22a, 22b, ..., 22f in the stand inlet adapter plate 22. The locking or clamp ring 26 can rotate a full 360° in rotation so as to be set for fastening to the stand inlet adapter plate 22.

6) Six bolts 40a, 40b, ..., 40f (see also bolts 40 (FIGS. 1a, 1b)) and six lock washers 42a, 42b, ..., 42f are installed in relation to the bolt holes 22a, 22b, ..., 22f of the stand inlet adapter plate 22 for threading into the corresponding openings 26a, 26b, ..., 26f of the locking or clamp ring 26.

7) When the pump housing 10 is angled to match up to the angle of the second coupling (not shown) of existing piping 12 (i.e. that corresponding to the second corresponding coupling 18 of the pump 10), the six bolts 40a, 40b, ..., 40f) can be threaded into the corresponding openings 26a, 26b, ..., 26f of the locking or clamp ring 26, and tightened and locked producing a watertight joint.

FIGS. 5 and 6

Alternative Embodiment

FIG. 5 shows an alternative embodiment of an adapter generally indicated as 50 according to the present invention in which two flanges 52, 54 are used, one 52 being coupled to the other 54 after the pump 56 is aligned. As shown in FIG. 6, the flanges 52, 54 include a multiplicity of bolt holes 60a, 60b, ..., 60h that need to be aligned in order to couple the flanges together after the pump is aligned. By way of example, the use of four bolt holes, for example, 60a, 60c, 60e and 60g, equidistantly and circumferentially spaced at, for example, 0°, 90°, 180° and 270° provides for 90° incremental angular alignment between the two flanges 52, 54 during installation. In comparison, the use of eight bolt holes 60a, 60b, ..., 60h equidistantly and circumferentially spaced provides for 45° incremental angular alignment between the two flanges 52, 54. In contrast, the embodiment shown in FIGS. 1-4 provides for non-incremental angular alignment at any angle of rotation between 0 and 360 degrees in rotation when aligning the pump.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Moreover, the scope of the invention is not intended to be limited to the type or kind of pump station, and may include pump stations now known (i.e. sewage pump stations, flood control pump stations, water purification pump stations, amusement park water ride stations, industrial fluids pump stations and/or agricultural fluid pump stations, etc.) as well as pump stations later developed in the future.

The invention claimed is:

1. An adapter for coupling a pump to existing piping, comprising:
    a first member configured with a first inner coupling aperture arrangement formed to receive corresponding inner coupling bolts to attach the first member to a first coupling of the existing piping, and also configured with a first outer coupling aperture arrangement formed to receive corresponding outer coupling bolts, the first member being a stand inlet adapter plate configured for attaching to an inlet of the existing piping;
    a second member configured with a second coupling aperture arrangement formed to receive second corresponding coupling bolts to attach the second member to a first port of the pump; and
    a third member configured to be arranged between the first member and the first port of the pump and also between the second member and the first port of the pump, so as to allow the second member and the pump to be freely rotated a full 360° degrees, if necessary, after the second member is attached to the first port of the pump, in order to align a second coupling of the existing piping to a second port of the pump, the third member also configured with a third coupling aperture arrangement formed to receive corresponding third coupling bolts to attach the third member to the first member after the pump is aligned for fastening the first coupling of the existing piping to the first port of the pump.

2. An adapter according to claim 1, wherein the second member is a collar or pump adapter plate configured for attaching to the first port of the pump and freely rotating in relation to the third member.

3. An adapter according to claim 2, wherein the third member is a clamp ring configured to be arranged between the second member and the first port of the pump so that the second member may freely rotate in order to align the second coupling of the existing piping to the second port of the pump, and also configured to tighten and lock to the first member after the pump is aligned.

4. An adapter according to claim 1, wherein the third member is a clamp ring configured to be arranged between the second member and the first port of the pump so that the second member may freely rotate in order to align the second coupling of the existing piping to the second port of the pump, and also configured to tighten and lock to the first member after the pump is aligned.

5. An adapter according to claim 1, wherein the adapter comprises a mating gasket arranged between the third member and the first port of the pump.

6. An adapter according to claim 1, wherein the adapter comprises an adapter gasket arranged between the first member and the second member.

7. An adapter according to claim 1, wherein the second member is arranged between the first member and the third member.

8. An adapter according to claim 1, wherein the first inner coupling aperture arrangement is configured with a plurality of inner bolt holes, each formed to receive a respective one of a corresponding plurality of inner bolts, and the first outer coupling aperture arrangement is configured with a plurality of outer bolt holes, each formed to receive a respective one of a corresponding plurality of outer bolts.

9. An adapter according to claim 1, wherein the second coupling aperture arrangement is configured with a plurality of second bolt holes, each formed to receive a respective one of a corresponding plurality of second bolts.

10. An adapter according to claim 1, wherein the third coupling aperture arrangement is configured with a plurality of third bolt holes, each formed to receive a respective one of a corresponding plurality of third bolts.

11. An adapter for coupling a pump to existing piping, comprising:
    a first member configured with a first inner coupling aperture arrangement formed to receive corresponding inner coupling bolts to attach the first member to a first coupling of the existing piping, and also configured with a first outer coupling aperture arrangement formed to receive corresponding outer coupling bolts;
    a second member configured with a second coupling aperture arrangement formed to receive second corresponding coupling bolts to attach the second member to a first port of the pump, the second member being a collar or pump adapter plate configured for attaching to the first port of the pump and freely rotating in relation to a third member; and the third member
    configured to be arranged between the first member and the first port of the pump and also between the second member and the first port of the pump, so as to allow the second member and the pump to be freely rotated a full 360° degrees, if necessary, after the second member is attached to the first port of the pump, in order to align a second coupling of the existing piping to a second port of the pump, the third member also configured with a third coupling aperture arrangement formed to receive corresponding third coupling bolts to attach the third member to the first member after the pump is aligned for fastening the first coupling of the existing piping to the first port of the pump.

12. An adapter according to claim 11, wherein the third member is a clamp ring configured to be arranged between the second member and the first port of the pump so that the second member may freely rotate in order to align the second coupling of the existing piping to the second port of the pump, and also configured to tighten and lock to the first member after the pump is aligned.

13. An adapter according to claim 11, wherein the first inner coupling aperture arrangement is configured with a plurality of inner bolt holes, each formed to receive a respective one of a corresponding plurality of inner bolts, and the first outer coupling aperture arrangement is configured with a plurality of outer bolt holes, each formed to receive a respective one of a corresponding plurality of outer bolts.

14. An adapter according to claim 11, wherein the second coupling aperture arrangement is configured with a plurality of second bolt holes, each formed to receive a respective one of a corresponding plurality of second bolts.

15. An adapter according to claim 11, wherein the third coupling aperture arrangement is configured with a plurality of third bolt holes, each formed to receive a respective one of a corresponding plurality of third bolts.

16. An adapter for coupling a pump to existing piping, comprising:
    a first member configured with a first inner coupling aperture arrangement formed to receive corresponding inner coupling bolts to attach the first member to a first coupling of the existing piping, and also configured with a first outer coupling aperture arrangement formed to receive corresponding outer coupling bolts;

a second member configured with a second coupling aperture arrangement formed to receive second corresponding coupling bolts to attach the second member to a first port of the pump; and a third member configured to be arranged between the first member and the first port of the pump and also between the second member and the first port of the pump, so as to allow the second member and the pump when coupled together to be freely rotated a full 360° degrees, if necessary, after the second member is attached to the first port of the pump, in order to align a second coupling of the existing piping to a second port of the pump, the third member also configured with a third coupling aperture arrangement formed to receive corresponding third coupling bolts to attach the third member to the first member after the pump is aligned for fastening the first coupling of the existing piping to the first port of the pump, the third member being a clamp ring configured to be arranged between the second member and the first port of the pump so that the second member may freely rotate in order to align the second coupling of the existing piping to the second port of the pump, and also configured to tighten and lock to the first member after the pump is aligned.

17. An adapter according to claim 16, wherein the first inner coupling aperture arrangement is configured with a plurality of inner bolt holes, each formed to receive a respective one of a corresponding plurality of inner bolts, and the first outer coupling aperture arrangement is configured with a plurality of outer bolt holes, each formed to receive a respective one of a corresponding plurality of outer bolts.

18. An adapter according to claim 16, wherein the second coupling aperture arrangement is configured with a plurality of second bolt holes, each formed to receive a respective one of a corresponding plurality of second bolts.

19. An adapter according to claim 16, wherein the third coupling aperture arrangement is configured with a plurality of third bolt holes, each formed to receive a respective one of a corresponding plurality of third bolts.

* * * * *